(12) United States Patent
Suren et al.

(10) Patent No.: US 6,982,044 B2
(45) Date of Patent: Jan. 3, 2006

(54) METHOD AND COMPOSITION FOR PREVENTING TRAFFIC SURFACES BECOMING SLIPPERY IN WINTER

(76) Inventors: Josef Suren, Kirchweg 23, D 33181 Bad Wunnenberg-Haaren (DE); Wilhelm Kamereit, Binger Weg 7, D 40229 Dusseldorf (DE)

( * ) Notice: Subject to any disclaimer, the term of this patent is extended or adjusted under 35 U.S.C. 154(b) by 0 days.

(21) Appl. No.: 10/323,067

(22) Filed: Dec. 19, 2002

(65) Prior Publication Data

US 2003/0116749 A1 Jun. 26, 2003

(30) Foreign Application Priority Data

Dec. 20, 2001 (DE) .......................... 101 63 080

(51) Int. Cl.
*C09K 3/18* (2006.01)
*E01C 11/24* (2006.01)

(52) U.S. Cl. .............................. 252/70; 106/13; 427/138
(58) Field of Classification Search .................. 252/70; 252/106/13; 427/138
See application file for complete search history.

(56) References Cited

U.S. PATENT DOCUMENTS

| 3,855,167 | A | | 12/1974 | Bowman | 523/208 |
|---|---|---|---|---|---|
| 4,012,537 | A | * | 3/1977 | Dubois | 427/138 |
| 4,243,415 | A | * | 1/1981 | Lowe, Jr. | 106/13 |
| 4,296,207 | A | * | 10/1981 | Siegmund | 521/53 |
| 4,434,190 | A | * | 2/1984 | Dubois et al. | 427/136 |
| 4,588,512 | A | * | 5/1986 | Rippie | 252/70 |
| 4,597,884 | A | * | 7/1986 | Greenwald | 252/70 |
| 4,936,915 | A | * | 6/1990 | Canzani | 106/13 |
| 5,079,036 | A | * | 1/1992 | Roe et al. | 427/212 |
| 5,441,760 | A | * | 8/1995 | Pattengill et al. | 427/138 |
| 5,667,718 | A | * | 9/1997 | Jones et al. | 252/70 |

FOREIGN PATENT DOCUMENTS

| DE | 24 26 200 | | 2/1975 |
|---|---|---|---|
| DE | 251269 A1 | * | 9/1976 |
| DE | 40 00 097 | | 7/1991 |
| DE | 196 02 925 | | 7/1997 |
| EP | 332803 A2 | * | 9/1989 |
| JP | 01-163285 A | * | 6/1989 |
| JP | 10-024267 A | * | 1/1998 |
| WO | WO-94/23130 A | * | 10/1994 |

* cited by examiner

*Primary Examiner*—Anthony J. Green

(57) ABSTRACT

A method of preventing traffic surfaces from becoming slippery in winter by application of a roadway surface layer made of a composition which is composed of a binder which is compatible with the traffic surfaces and which comprises a thawing agent, enveloped in a temporarily water-impermeable solid-material jacket, and where appropriate, further allures and additives and the temporarily water-impermeable solid-material jacket of the thawing agent is preferably composed of a cured phenolic resin.

10 Claims, No Drawings

METHOD AND COMPOSITION FOR PREVENTING TRAFFIC SURFACES BECOMING SLIPPERY IN WINTER

The invention relates to an improved method of preventing traffic surfaces becoming slippery in winter through application of a roadway surface layer made from a composition which comprises a thawing agent.

STATE OF THE ART

DE-A 24 26 200 discloses a mix material for producing a road surface which inhibits the formation of ice and thaws snow, wherein the asphaltic and/or bituminous mix material comprises components composed of a thawing substance and an outer, watertight shell. When this mix material is used, these components are incorporated into the road surface, over the entire thickness of the surface. They are exposed by abrasion, the shell is destroyed and the thawing substance is released. Accordingly, the thawing substance is released in warm seasons as well as is washed out. The resulting cavities are occupied by water, which in a cold spell, leads to increased disintegration of the road surface. The mix material according to this invention, therefor, neither is environmentally compatible nor corresponds to the durability requirements imposed on a road surface.

EP-A 153 269 and DE-A 41 29 621 discloses a process in which for granulating a bitumen-bound road surface mixture one or more substances which lower the freezing point of water, and also hydrophobic components such as polyurethane or hydrophobicizing amorphous silicas are introduced and these road surface mixtures are applied as additional thin top layers to traffic surfaces.

In accordance with an earlier German patent application (file reference 101 17 437.3), existing traffic surfaces are sprayed, prior to a spell of frost, with a bitumen emulsion which comprises a thawing agent which, after the emulsion has dried, remains embedded in the dry bitumen mass and which is gradually released as a result of the embrittlement of the bitumen as temperatures fall, and resultant microcracks, and with assistance by abrasion.

A disadvantage common to all these processes is that in the case both of the hydrophobicizing substances and of bitumen and retardant effect on the release of the thawing agent is very low. The thawing agents employed are leached from the surface within just a few weeks, with the consequence that the anti-icing effect subsides markedly and is often already absent when spells of frost set in.

OBJECTS OF THE INVENTION

It is an object of the invention to provide an improved method of preventing traffic surfaces becoming slippery in winter, which is as easy to employ as the known processes but in which the thawing agents are released very slowly, and, as far as possible, only as and when needed, so that the desired effect is sustained for as long as possible.

It is another object of the invention to provide novel compositions for use in said method.

These and other objects and advantages of the invention will become obvious from the following detailed description.

THE INVENTION

The novel method of the invention of preventing traffic surfaces from becoming slippery in winter, by application to a roadway surface layer a composition which comprises a thawing agent which is slowly released under traffic load in winter, wherein the composition is composed of a binder which is compatible with the traffic surfaces and which envelopes a thawing agent, in a temporarily water-impermeable solid-material jacket, and optionally, further fillers and additives.

The compositions of the invention for implementing the said method are comprised of a binder compatible with the traffic surfaces and envelopes a thawing agent in a temporarily water-impermeable solid-material jacket, and optionally, further fillers and additives.

It has been found that the release of thawing agents from a tin roadway surface layer occurs very slowly and, particularly, in a controlled manner depending on the traffic load if the composition applied to the traffic surface comprises a thawing agent which is enveloped in a temporarily water-impermeable, solid-material jacket.

In the preferred embodiment, the temporarily water-impermeable, solid-material jacket at temperatures above 19° C. is coherent and is to a certain extent, flexible. It protects the thawing agent against rainwater and the flexibility which exists reduces abrasion of the water-impermeable solid-material jacket and thereby prolongs the duration of the activity of the inventive composition.

As temperatures fall, the water-impermeable solid-material jacket becomes more and more brittle and develops cracks and is more easily destroyed by pressure and abrasion. The enveloped thawing agent is released slowly and over a long period of time and, particularly, in a controlled manner depending on traffic load. The thawing agent is exposed to attack by moisture, and is able to develop its freezing-point-reducing effect to prevent the traffic surface from becoming slippery in winter. As a result of the very slow release of the thawing agent in a controlled manner depending on the traffic load on the traffic surface, the activity of the inventive composition is maintained over a long period of time, generally, throughout an entire spell of frost.

In accordance with the invention, therefore, before a spell of frost and also, as and when required, during a period of frost, a thin layer is applied to a clean traffic surface of a composition which is composed of a binder which is compatible with the traffic surface and which envelopes a thawing agent and further fillers and additives in a temporarily water-impermeable solid-material jacket. The composition to be applied may be a ready-premixed mixture which is applied as such to the traffic surface. Alternatively, it may be composed of a number of separate components which are applied to the traffic surface simultaneously and which do not constitute a finished mixture until they are on the traffic surface.

Most simply, the binder which is compatible with the traffic surface is bitumen, specifically either hot bitumen or a bitumen emulsion. Alternatively, it may constitute cement, which is applied in the form of a cement slurry produced shortly beforehand, or a curable or non-curable polymer emulsion. Also useful are polymer-modified bitumen or synthetic-resin-modified cement slurries, especially cement slurries comprising emulsified epoxy. resin/hardener mixtures, such as may also be used, for example, for repairing grooves in lanes.

Where the composition is a ready-prepared mixture, it can be applied simply to the traffic surfaces by knifecoating or spreading. The preferred method of application, however, is that of spraying. Where the composition is composed of two or more separate components, these components are sprayed onto the traffic surfaces from separate nozzles but simultaneously so that they are completely mixed.

Examples of this are the simultaneous but separately sprayed application of a bitumen emulsion on the one hand and of the thawing agent enveloped in a temporarily water-impermeable solid-material jacket on the other hand, it being possible for the said thawing agent to be in the form of a separate dispersion as well. Also, however, is the simultaneous but separate sprayed application of a cement slurry, an epoxy resin emulsion and, separate from it, a hardener component.

Thawing agents are water-soluble substances which, with ice, are able to form a liquid low-temperature mixture which freezes only on reaching a eutectic temperature well below 0° C. Examples thereof are water-soluble salts, especially alkali metal salts or alkaline earth metal salts, but also polyalcohols, especially glycol or glycerol. These thawing agents may be used individually or in a mixture with one another and also in a mixture with other fillers and adjuvants. The preferred thawing compositions are sodium chloride or calcium chloride. The solid thawing agents are present with a particle size of not more than 1 mm, preferably, not more than 0.3 mm and the thawing agents are enveloped in a temporarily water-impermeable solid-material jacket.

In accordance with the invention, temporarily means that the solid-material jacket is impermeable to water if it is not damaged mechanically, by abrasion for instance, and that it has a temperature-dependent imperviousness. It is water-impermeable preferably at temperatures above about 1° C. When temperatures fall below this level, the solid-material jacket becomes more and more brittle and fissured. In this case, and following mechanical damage, moisture is able to penetrate through the solid-material jacket, which is no longer coherent, and to leach the thawing agent.

These properties are achieved if the temporarily water-impermeable solid-material jacket is composed of a plastic which becomes brittle at low temperatures, preferably, a cured thermoset plastic which becomes brittle at low temperatures.

Examples of thermoset plastics of this kind which become brittle at low temperatures are melamine resins, urea resins or phenolic resins. The temporarily water-impermeable solid-material jacket is composed preferably of a crosslinked phenolic resin, with particular preference of a crosslinked low-molecular-weight phenolic resin, more preferred is a crosslinked phenolic resin prepared by acidic condensation of a phenolic compound with formaldehyde in which the molar ratio of phenolic compound to formaldehyde is situated within the range from 1:02. to 1:0.4. Phenolic resins of this kind are known from EP-B 0 248 980, where by are used for producing high-temperature-resistant molding materials. These are products which are semisolid to sold at room temperature and which, without the use of solvents and at moderate temperature, are suitable for enveloping solid materials which have a high reactivity, i.e. readily undergo crosslinking to form a stable, water-impermeable layer, and which have the desired temperature-dependent imperviousness as an envelope material for thawing agents.

To produce the enveloped thawing agents, the solid thawing agents, which may, where appropriate, have been wetted with small amounts of liquid thawing agents, and which are in the form of particles with a size of not more than 1 mm, preferably not more than 0.3 mm, are enveloped in a manner known per se with about 2 to 10%, preferably from 2 to 5%, of their weight of plastics which become brittle at low temperatures. The thawing agents are preferably mixed with the thermoset plastics which become brittle at low temperatures, and are heated beyond the melting pint of the thermosetting resin.

The thawing agent becomes enveloped, then, the hardener for the thermosetting resin is added and the mixture is heated to a temperature above the hardening temperature of the thermosetting resin, with the mixing operation being continued until the thermosetting resin has hardened. After cooling, the enveloped thawing agents are obtained in the form of a powdery product.

For the purpose of further water repellency treatment and also for improved individualization in the composition of the invention, the said product may be treated additionally with from 0.5 to 5% of its weight of a hydrophobic release agent, such as oleic acid or stearic acid, stearate or a fatty acid amide, for instance. Particularly effective retardation of water penetration is achieved if the enveloped thawing agent is treated with a hydrophobicized release agent, such as a stearate-treated alkaline earth metal salt, in particular calcium oxide treated with Mg stearate.

The compositions of the invention are then obtained in a simple manner by mixing the traffic-surface-compatible binder with the enveloped thawing agents and optionally, with further fillers and additives. The weight ratio of binder to enveloped thawing agent can be selected from 200:50 to 100:200, with the abrasion resistance of the composition being increased as the proportion of binder rises.

Various modifications of the method and compositions of the invention may be made without departing from the spirit or scope thereof. It is to be understood that the invention is intended to be limited only as defined in the appended claims.

What we claim is:

1. A method of preventing traffic surfaces from becoming slippery in winter comprising applying to a roadway surface a layer made from a composition comprising a thawing agent which is slowly released under traffic load in winter, and a binder which is compatible with the traffic surfaces and which envelopes the thawing agent, in a temporarily water-impermeable solid-material jacket the temporarily water-impermeable solid-material jacket of the thawing agent is a crosslinked, phenolic resin which becomes brittle at temperatures below 1° C. and optionally, further fillers and additives.

2. The method of claim 1, wherein the composition composed of the binder which is compatible with the traffic surfaces and the thawing agent enveloped in a temporarily water-impermeable solid-material jacked is produced by simultaneous application of the two components to the traffic surface.

3. A composition for implementing the method of claim 1 comprising a binder compatible with the traffic surfaces and which envelopes a thawing agent in a temporarily water-impermeable solid-material jacket the temporarily water-impermeable solid-material jacket of the thawing agent is a crosslinked, phenolic resin which becomes brittle at temperatures below 1° C. and optionally, further fillers and additives.

4. A composition of claim 3 wherein the binder which is compatible with the traffic surfaces is bitumen.

5. A composition of claim 3 wherein the binder which is compatible with the traffic surfaces is bitumen in the form of a bitumen emulsion and is not mixed with the thawing agent enveloped in a temporarily water-impermeable solid-material jacket until application to the traffic surface.

6. A composition of claim 3 wherein the binder is compatible with the traffic surfaces is cement.

7. A composition of claim 3 wherein the temporarily water-impermeable solid-material jacket of the thawing agent is a crosslinked phenolic resin prepared by acidic condensation of a phenolic compound with formaldehyde, wherein the molar ratio of the phenolic compound to formaldehyde is situated within the range of from 1:0.2 to 1:0.4.

8. A composition of claim 3 wherein the thawing agent is in a particle size of not more than 1 mm.

9. A composition of claim 3 wherein the thawing agent is in a particle size of not more than 0.3 mm.

10. A composition of claim 3 wherein the enveloped thawing agent has been additionally treated with a hydrophobic or hydrophobicized release agent.

* * * * *